Figure 3:
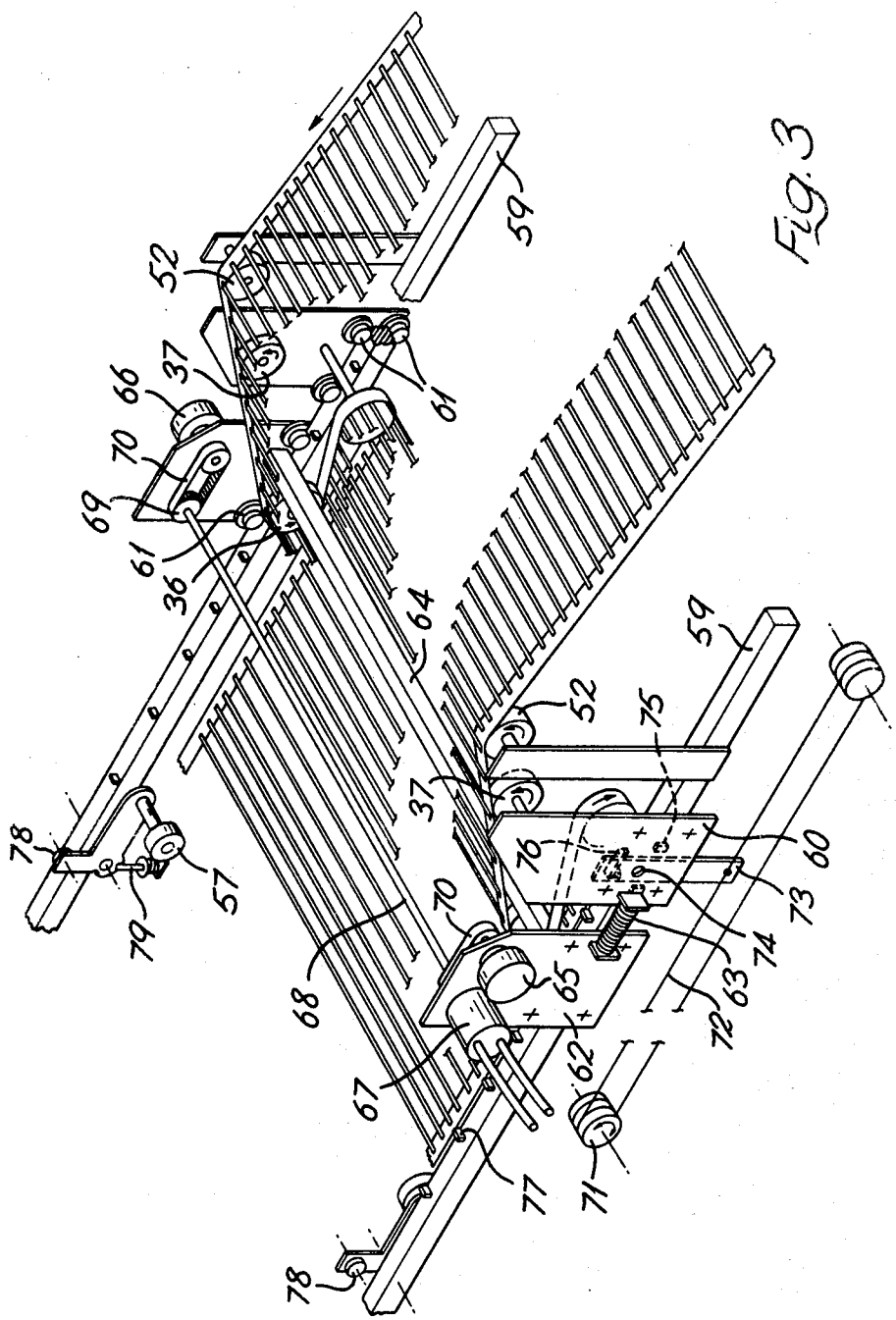

United States Patent [19]

McRae

[11] 4,448,257  
[45] May 15, 1984

[54] SOIL-SEPARATING ASSEMBLIES

[75] Inventor: Douglas C. McRae, Penicuik, Scotland

[73] Assignee: National Research Development Corporation, London, England

[21] Appl. No.: 396,684

[22] Filed: Jul. 9, 1982

[51] Int. Cl.³ .................. A01D 13/00; A01D 17/00
[52] U.S. Cl. .................. 171/127; 171/130; 171/133; 198/812; 56/327 R; 209/308
[58] Field of Search ............... 171/127, 130, 131, 132, 171/133, 14, 124, 126; 198/812; 209/307, 308; 56/341, 327 R

[56] References Cited

U.S. PATENT DOCUMENTS

| 1,751,898 | 3/1930 | Uhlig | 198/812 |
|---|---|---|---|
| 3,159,270 | 12/1964 | Johnston | 171/127 |
| 3,548,895 | 12/1970 | Gentry, Jr. | 198/812 |
| 3,690,383 | 9/1972 | Malley et al. | 171/126 |
| 3,751,873 | 8/1973 | Toby | 198/812 |
| 4,168,776 | 9/1979 | Hoeboer | 198/812 |
| 4,210,237 | 7/1980 | Gram | 198/812 |
| 4,231,470 | 11/1980 | Parkes | 198/812 |
| 4,281,757 | 8/1981 | Morton | 198/812 |

FOREIGN PATENT DOCUMENTS

| 23369 | 2/1981 | European Pat. Off. | 171/14 |
|---|---|---|---|
| 197807 | 6/1977 | Fed. Rep. of Germany | 171/126 |
| 855422 | 11/1960 | United Kingdom . | |
| 984232 | 2/1965 | United Kingdom . | |
| 1004222 | 9/1965 | United Kingdom . | |
| 1187571 | 4/1970 | United Kingdom . | |
| 1225474 | 3/1971 | United Kingdom . | |
| 1431905 | 4/1976 | United Kingdom . | |
| 1543158 | 3/1979 | United Kingdom . | |
| 2029353A | 3/1980 | United Kingdom . | |
| 2040040 | 12/1980 | United Kingdom | 171/127 |
| 1601478 | 10/1981 | United Kingdom . | |

Primary Examiner—John J. Wilson  
Assistant Examiner—David I. Tarnoff  
Attorney, Agent, or Firm—Cushman, Darby & Cushman

[57] ABSTRACT

A potato harvester comprises a double disc share feeding potatoes to a vibrating upwardly-moving conveyor sieve 1 (FIG. 1), the operational area of which is determined by the relative positions of rollers 2 and 4. This area can be changed to deal with different soil conditions, any slack or excess amount of conveyor 1 resulting from this change being accommodated by an appropriate repositioning of the pulleys 4, 5.

11 Claims, 3 Drawing Figures

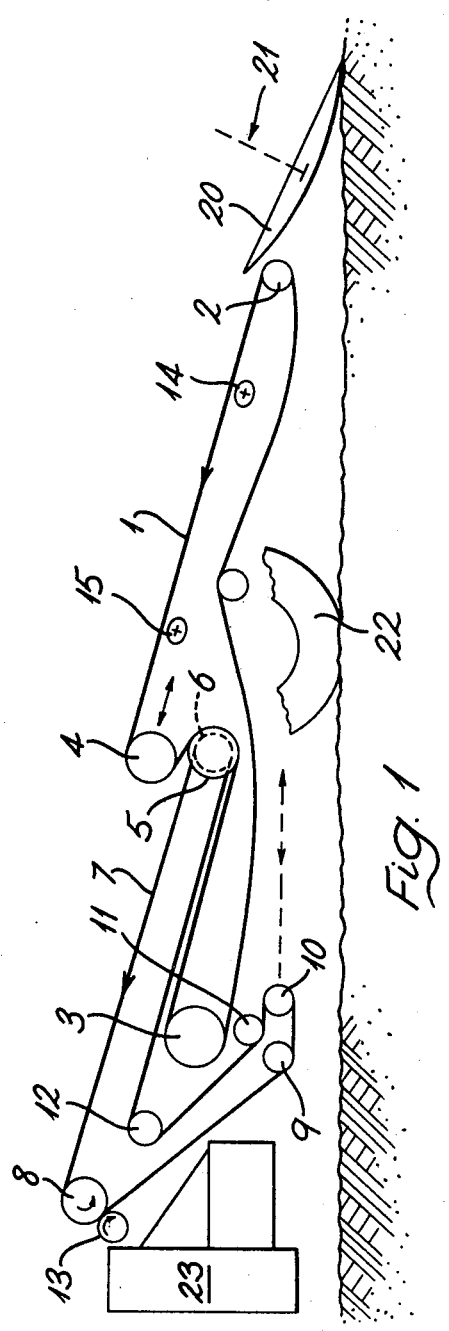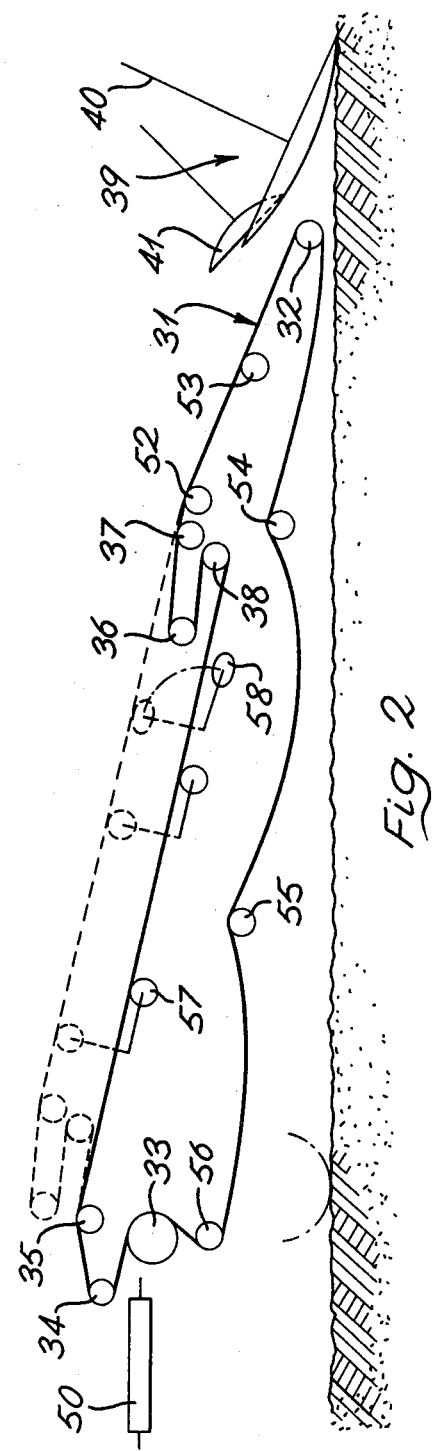

SOIL-SEPARATING ASSEMBLIES

The present invention relates to soil separating assemblies e.g. for use in or with root-crop harvesters, in particular, but not exclusively, potato harvesters.

It has already been established that with conventional potato harvesters, the damage to the potatoes can be greatly influenced by the speed of the moving web onto which the potatoes are first deposited and the ratio of this speed to the forward speed of the harvester.

The influence of web speed may be understood from the fact that as soon as the protective layer of soil adhering to the potatoes has been removed by their tumbling motion on the web, further motion of this type can damage the potatoes as they knock into one another or into stones or clods also present on the web, or on the web bars.

The influence of the ratio of web speed to forward speed of the harvester may be understood from the fact that the greater the relative movement between the web and that part of the soil ridge engaged by the web, the more likely is it that the soil around the potatoes will be broken up as it first moves on to the web.

Unfortunately, there are no single values of web and ground speed which will minimise the two effects described above irrespective of ground conditions. Accordingly, at least one British harvester manufacturer now produces machines with the facility for altering web speed independently of ground speed. However this is not the whole answer because even with independent web speed adjustement, there will be occasions when control of web speed along will not be enough to minimise potato damage. For example, in very dry conditions, virtually all the soil may be removed through the first few feet of web whatever the values of web and ground speed with the result that the potatoes pass along substantially the whole length of the web without any protective soil cover at all. This leads to tuber damage due to the fact the web will be sloping at 25° or so to the horizontal and this slope encourages the potatoes to roll back along the web when the latter is agitated to enhance the sieving action.

Conversely, in very wet conditions, the sieving area may be inadequate even at a relatively high web speed and level of agitation, with the result that significant amounts of excess soil will find their way to those parts of the machine downstream of the web. This could result in the malfunction of those parts or delivery of soil with the potatoes from the digger or harvester.

An object of the present invention is to provide a soil separating means in which the problems outlined above are at least to some extent overcome.

According to the present invention there is provided for use with root-crop lifting means, a soil separating assembly comprising a conveyor sieve for transporting the crop rearwardly from the crop lifting means to another part of the assembly, and an area control means for varying the effective sieving area of the conveyor sieve.

Preferably, the assembly also includes agitation means for imparting mainly horizontal accelerations to that part of the sieve leading rearwardly from the lifting means to the area control means. Where the sieve takes the form of a web for example, then the mainly horizontal accelerations above referred to may be parallel or at right angles to the web rods. Hitherto soil separating webs in potato harvesters and the like have been subjected to vertical agitation by eccentric or lobed web agitators or by oscillating rollers which cause the web to dance up and down applying vertical oscillations to the crop. With the preferred form of the present invention, however, the mainly horizontal accelerations referred to above have been found to accomplish a superior soil sieving rate per unit area with less tuber damage.

Conveniently, when agitation means are provided as above described, then the agitation means are controlled by a speed control means operative to control the severity of mainly horizontal agitation to be imparted to the sieve by the agitation means.

Conveniently, the area control means includes two rotatable members around which the conveyor sieve passes, the position of at least one of the two members being adjustable relative to the frame of the assembly. Where the sieve comprises a web, for example, this can be achieved by having each of the two members adjustable relative to the front rollers of the web.

If desired, the positions of the two members relative to one another may be rendered automatically adjustable by a linkage acting between the supports for the two members.

Conveniently, the conveyor sieve passes around said two members in an S-shaped configuration.

Conveniently, the said other part of the assembly comprises a transporter belt which is adjustable to compensate for any change in the delivery point of the conveyor sieve arising from a change in the effective sieving area of the sieve. In this case, if the conveyor sieve passes around the two rotatable members in S-shaped configuration as above described, then conveniently the transporter belt is automatically adjustable by having the transporter belt pass around a rotatable support member mounted coaxially with the second of the two rotatable members constraining the conveyor sieve to adopt an S-shaped configuration.

Alternatively the transporter belt may be omitted and the said other part of the assembly may then be provided by another region of the sieve located downstream of the area control means. In one embodiment for example where the sieve takes the form of a web, the crop with any remaining soil an other debris is delivered over an S-shaped contour in the web to a non-agitated portion of the web downstream of this contour.

Speed control means are preferably provided for varying the speed of the conveyor sieve independently of the ground speed of the assembly.

The invention also includes a root-crop harvester incorporating a soil separating assembly according to the present invention and in particular, but not exclusively, such a harvester in which the crop lifting means comprises a double disc share.

Embodiments of the invention will now be described, by way of example only, with reference to the accompanying drawings in which:

FIGS. 1 and 2 illustrate, in diagrammatic form, side elevations of alternative designs of potato harvester according to the present invention; and FIG. 3 is a somewhat diagrammatic isometric view showing details of one form of sieve and agitation means.

Thus referring first to FIG. 1 of the drawings, a potato harvester according to the present invention incorporates a soil separating assembly in which a conveyor sieve or "web" passes around conventional front rollers 2 and drive sprockets 3.

In this embodiment, the area control means is provided by area-adjusting sprockets 4 and 5 capable of being slid in unison parallel to the top run of the web 1 in a direction towards or away from the front rollers 2.

Concentric with the shaft for sprocket 5 is a loose roller 6 of somewhat smaller diameter than the sprocket 5. This roller carries a flat belt or cushioned rod link transporter belt 7 disposed to receive potatoes from the discharge end of web 1. This belt, which passes over driving roller 8 and idler rollers 9, 10, 11 and 12, is held taut by a tensioning spring (not shown) attached to the bearing housings of roller 10.

The web 1 is designed to receive potatoes from a pair of double disc shares 20, e.g. of the kind described in U.K. patent application No. 43560/77. These are rotatable about axes 21 the forward inclination of which advantageously allows the roller 2 to be located well above ground level instead of just above as would be required if a conventional share were used in place of the disc shares. This in turn allows a web inclination for the operative run of the web of about 15° to the horizontal (as compared with the value of about 25° or so commonly found in conventional potato harvesters). By reducing the web inclination in this way the likelihood of potatoes rolling back towards the front of the belt is lessened and the resulting risk of damage which may occur to the potatoes as a consequence is reduced. Alternatively, it is possible for the web to be used in conjunction with a conventional flat, passive share.

Web 1, which may be agitated by one or more agitator units 14, 15 to sieve out the soil received from the shares 20, delivers the mixture of potatoes, stones, clods and any remaining loose soil to belt 7 and then to a separator unit which could for example be an X-ray separator 23, e.g. of the kind described in U.K. Patent Specifications 1431905, 1004222 and 984232.

The arrangement is completed by a haulm stripping roller 13 fitted as shown and by ground wheels 22 for the machine.

The area-adjusting sprocket assembly is adjustable by manual control e.g. following visual assessment of the extent of soil cushioning present. Thus if in operation of the machine, the soil conditions are found to vary from those for which the illustrated arrangement is currently adjusted, then the area-adjusting sprocket assembly carrying sprockets 4 and 5 is moved towards roller 2 (to reduce the effective web area) if there is too little loose soil on the web and away from roller 2 (to expose more web) if there is too much loose soil.

It will be appreciated that changes in position of roller 6 will entail movement of roller 10 to increase or decrease the proportion of belt 7 required to cover the sieving area and this is done by an appropriate linkage (not shown), e.g. in the form of a spring-tensioning arrangement, acting between the supports for the two rollers.

The maximum area of web 1 that can be exposed to deal with very wet soil conditions will correspond to the situation where sprocket 5 becomes so close to sprocket 3 that it starts to decrease the wrap of the web 1 round sprocket 3. To deal better with wet conditions, further agitators (not shown) are provided which can be swung into place for web 1 if required, e.g. by a suitable linkage, when the maximum web area is exposed.

Control of the web speed independently of the ground speed of the machine may be achieved by a conventional gear box in the drive to sprockets 3. A steplessly variable drive (such as a variable V-pulley) may be used instead of the gear box, if desired.

Referring next to FIG. 2 of the drawings, a second design of potato harvester according to the present invention once again incorporates a soil-separating assembly in which a conveyor-sieve or "web" 31 passes round conventional front rollers 32 and drive sprockets 33. However, in this case, drop-minimising rollers 34 and 35 are fitted and the area control means is provided by area adjusting rollers 36, 37 and 38.

The web 31 is designed to receive potatoes from a pair of double disc shares 39 of a kind described in U.K. patent application No. 43560/77. These are rotatable about axes 40, the forward inclination of which advantageously allows roller 32 to be located well above ground level instead of just above as would be required if a conventional share were used in place of the disc shares.

The digging disc with the assistance of scraper disc 41 in turn allows a web inclination for the operative run of web rearwards of roller 52 of about 15° to the horizontal (as compared with the value of 25° so commonly found in conventional potato harvesters). By reducing the web inclination in this way, the likelihood of potatoes rolling back towards the front of the web is lessened and the resulting risk of damage which may occur to the potatoes as a consequence is reduced. Alternatively it is possible for the web to be used in conjunction with a conventional flat, passive share (not shown).

Returning to FIG. 1 for a moment to highlight the differences between the two embodiments, it will be seen that the arrangement of FIG. 1 lacks the drop-reducing roller arrangement (rollers 34 and 35) of the later embodiment and that the roller 37 is also omitted. In the FIG. 1 embodiment, a plain transporter belt 7 passes over a free running roller 6 concentric with the sprocket 5. Belt 7 then passes over roller 8 and returns by way of rollers 9, 10, 11 and 12. Roller 10 is anchored to a spring tensioner (not shown) so that if the assembly, carrying rollers 4 and 6 over which the web describes an "S" shaped motion, is moved towards or away from the delivery point at roller 8, then the surplus belt will be kept taut by the tensioner. A haulm-stripping roller 13 completes this arrangement.

Returning now to the embodiment of FIG. 2, in operation of this embodiment, the mixture of potatoes, stones and clods and any remaining loose soil on the unagitated portion of the web feeds to a plain side delivery belt 50 either directly or via a separator unit which could for example be an X-ray separator, e.g. of the kind described in U.K. Patent Specification Nos. 1,431,905, 1,004,222 and 984,232. This unit could be located in a similar position to separator 23 in FIG. 1, for example.

The web 31 is supported on a series of static rollers 52, 53, 54, 55, 56 and on rollers on bell cranks 57 (number depending on the length of web utilised). As the carriage carrying rollers 36, 37, 38 move towards the delivery end of the web, a mechanism (to be described more fully with reference to FIG. 3) raises each roller on cranks 57 as the carriage elevates the web to the position shown in broken lines in FIG. 2.

Where conventional agitators are to be used, the rollers under the solid line representing the web in FIG. 2 remain in a fixed position, but cranks bearing an appropriate number of agitator eccentrics are actuated to raise these agitating means to the new level of the web shown in broken line. For wet soil conditions where eccentric agitators are used, rollers 52 and 53 may be replaced by eccentric agitators. An example of the raised position of an eccentric roller 58, is shown in ghosted outline in FIG. 2. In the lower rest position the agitator lies clear of the web.

As already indicated above, hitherto conventional eccentrics have been used to impart a mainly vertical acceleration to the web whilst a mainly horizontal acceleration, or rather one parallel to the direction of travel of the web, which is of low slope, would be beneficial in minimising tuber damage. FIG. 3 illustrates in more detail part of the FIG. 2 embodiment showing how this mainly horizontal acceleration may be accomplished. FIG. 3 also shows the carriage arrangement for altering the effective sieving area of the FIG. 2 arrangement.

Thus referring now to FIG. 3, the carriage which moves along the harvester frame member 59 consists of a non-agitated side plate member 60 mounted on the frame 59 by four flanged rollers 61, and an agitated side plate member 62 also mounted on the frame member on four flanged rollers 61. The two elements of the carriage are separated by a coil spring connected to plate 60 or by other shock absorbing means 63. The side plate members comprising the carriage on each side of the harvester are linked by bridge pieces, one of which is shown (64). Each side plate member 62 carries plain rollers 36 which are free running, but may be fitted with a free-wheel hub permitting motion in the counter clockwise direction only. Attached rigidly to each side plate member is a proprietary rotary vibrating shaker drive (65 and 66) driven from a hydraulic motor 67 via shaft 68. The shaker units are driven by pulleys 69 and timing belts 70 to ensure synchronisation. The second shaker (66) is driven from shaft 68 through timing belt 70 from the hydraulic motor.

In addition to the facility of agitating part of the carriage, the entire carriage is provided with a means of moving along the chassis. This means comprises a hydraulically operated winch (not shown), which by rotating drum 71 anticlockwise, causes cable 72 to impart a pull on link 73 pivoted at 74 and free to swing within the limits of stops 75. When under the action of the winch, the link 73 rotates about pivot 74 and raises pawl 76 by means of a pin (not shown) above one of a series of stops 77 extending along the frame member 59, thereby releasing the carriage so that it can progress along the frame until the hydraulic winch is stopped. On releasing the cable load the pawl engages with the nearest stop, inhibiting regression of the carriage along the sloping frame.

Finally, the series of bell cranks carry rollers 57 in the case of a harvester fitted with vibrating shakers, rather than eccentric agitators. The bell cranks are consecutively rotated through 90° when the carriage passes by contact with a suitably shaped shoe (not shown) on the side plate member 60 and the small roller 78 on the bell crank. A suitable spring loaded detent 79 ensures that the bell crank remains locked in the new position until the shoe on side plate 60 (not shown) returns the bell crank to the alternative position on the return journey of the carriage.

The web area-adjusting carriage is adjustable by manual control e.g. following visual assessment of the extent of soil cushioning present. Thus if an operation of the machine of FIGS. 2 and 3 the soil conditions vary from those for which the illustrated arrangement is currently adjusted and there is too much loose soil on the web, a manual input from an operator will move the area-adjusting carriage carrying roller 36 towards roller 35 (FIG. 2) thereby effectively to increase the sieving area of the web. If there is too little loose soil on the web then the carriage is instead moved towards the share (roller 32) thereby reducing the effective sieving area.

It will be appreciated that, with the arrangement of FIG. 1, changes in the position of roller 4 will entail movement of roller 10 to increase or decrease the proportion of transporter belt 7 required to cover the sieving area and this is done by an appropriate spring tensioning arrangement (not shown). In the more simple arrangement of FIG. 2, however, this does not apply. In this latter embodiment the maximum area of web 31 that can be exposed to deal with very wet conditions corresponds to the situation where roller 36 is in the position shown by the broken line in FIG. 2.

In the embodiment of FIGS. 2 and 3, control of the web speed independently of the ground speed of the machine may once again be achieved by a conventional gearbox in the drive to sprockets 33. Again, a steplessly variable drive (such as a variable V-pulley) may be used instead of the gearbox, if desired.

In the embodiment of FIGS. 2 and 3, the web is subjected to a mainly horizontal agitation due to the agitation of the shakers. The shakers produce two force peaks at 180°. They are so mounted that the force peaks occur in a plane parallel to the frame members 59. The force applied towards the delivery end of the harvester causes the free part of the carriage to accelerate in that direction and also the roller 36 and that part of the web from rollers 32 to rollers 36 to accelerate mainly horizontally. The carriage acceleration continues until the force decays and then acceleration occurs in the reverse direction. This acceleration could be for example in the range 1.0–2.5 g at amplitude 25 mm. During reversal, energy is stored in spring 63, the carriage side plate members being held by pawl 76 and one of the stops 77.

The applied force can be reduced by diminishing the speed of rotation of the shaker units. The acceleration is substantially dependent on the mass of that part of the carriage which oscillates and of the portion of the web vibrated, but not the soil burden on the web unless it is very heavily laden.

Controls for the harvester may include automatic or manual adjustment of web area, web speed and shaker drive speed.

Although the illustrated arrangements of FIGS. 1, 2 and 3 have been described as incorporated in a potato harvester, it will be appreciated that they are equally suited for incorporation, with minor modifications if necessary, into other forms of root-crop harvester, e.g. harvesters for sugar beet and possibly also for daffodil bulbs, etc., an also in potato diggers.

Where in this application the term "mainly horizontal" has been used to describe the motion of the sieve, it should be understood that this term is used for convenience only and should more accurately be considered as the motion of the sieve in the plane of movement of the sieve (relative to the frame of the assembly) when substantially no vertical vibratory movement of the sieve perpendicularly to this plane is taking place.

I claim:

1. For use with a crop lifting means for a root-crop, a soil separating assembly comprising a conveyor sieve for transporting the crop rearwardly from the crop-lifting means to another part of the assembly and area control means for varying the effective sieving area of the conveyor sieve by varying the effective length of the conveyor sieve, said assembly further including agitation means for imparting mainly horizontal oscillations to that part of the sieve leading rearwardly from said lifting means to said area control means.

2. An assembly as claimed in claim 1 in which the agitation means is controlled by a speed control means operative to control the severity of mainly horizontal agitation to be imparted to the sieve by the agitation means.

3. An assembly as claimed in claim 1 in which said assembly includes a frame and the area control means includes two rotatable members around which the conveyor-sieve passes, the position of at least one of the members being adjustable relative to the frame of the assembly.

4. An assembly as claimed in claim 1 in which the assembly includes a frame and the area control means includes two rotatable members including supports therefor around which the conveyor sieve passes, the position of at least one of the two members being adjustable relative to the frame of the assembly and in which the positions of the two members relative to one another is rendered automatically adjustable by a linkage acting between the supports for the two members.

5. An assembly as claimed in claim 3 in which the conveyor sieve passes around said two members in an S-shaped configuration.

6. An assembly as claimed in claim 1 in which the said other part of the assembly comprises a transporter belt which is adjustable to compensate for any change in the delivery point of the conveyor sieve arising from a change in the effective sieving area of the conveyor sieve.

7. An assembly as claimed in claim 1 in which the said other part of the assembly is provided by a region of the sieve located downstream of the area control means.

8. An assembly as claimed in claim 1 in which the conveyor sieve passes around two members in an S-shaped configuration, the said other part of the assembly comprises a transporter belt which is adjustable to compensate for any change in the delivery point of the conveyor sieve arising from a change in the effective sieving area of the conveyor sieve and the transporter belt is automatically adjustable by having the transporter belt pass around a rotatable support member mounted coaxially with the second of the two rotatable members constraining the conveyor sieve to adopt an S-shaped configuration.

9. An assembly as claimed in claim 1 including speed control means for varying the speed of the conveyor sieve independently of the ground speed of the assembly.

10. A root-crop harvester incorporating a soil-separating assembly comprising a conveyor sieve for transporting the crop rearwardly from a crop-lifting means to another part of the assembly and area control means for varying the effective sieving area of the conveyor sieve by varying the effective length of the conveyor sieve, said assembly further including agitation means for imparting mainly horizontal oscillations to that part of the sieve leading rearwardly from said lifting means to said area control means.

11. A root-crop harvester comprisng crop-lifting means including a double-disc share and incorporating a soil-separating assembly comprising a conveyor sieve for transporting the crop rearwardly from the crop-lifting means to another part of the assembly and area control means for varying the effective sieving area of the conveyor sieve by varying the effective length of the conveyor sieve, said assembly further including agitation means for imparting mainly horizontal oscillations to that part of the sieve leading rearwardly from said lifting means to said area control means.

* * * * *